(12) United States Patent
Loh et al.

(10) Patent No.: US 12,545,445 B2
(45) Date of Patent: Feb. 10, 2026

(54) ROTARY WING AIRCRAFT

(71) Applicant: The Board of Regents for the Oklahoma Agricultural and Mechanical Colleges, Stillwater, OK (US)

(72) Inventors: Weng Kheong Loh, Stillwater, OK (US); Jamey D. Jacob, Stillwater, OK (US)

(73) Assignee: The Board of Regents for the Oklahoma Agricultural and Mechanical Colleges, Stillwater, OK (US)

( * ) Notice: Subject to any disclaimer, the term of this patent is extended or adjusted under 35 U.S.C. 154(b) by 0 days.

(21) Appl. No.: 18/705,949

(22) PCT Filed: Nov. 4, 2022

(86) PCT No.: PCT/US2022/049002
§ 371 (c)(1),
(2) Date: Apr. 29, 2024

(87) PCT Pub. No.: WO2023/081387
PCT Pub. Date: May 11, 2023

(65) Prior Publication Data
US 2024/0417113 A1    Dec. 19, 2024

Related U.S. Application Data

(60) Provisional application No. 63/276,165, filed on Nov. 5, 2021.

(51) Int. Cl.
*B64U 10/13* (2023.01)
*B64U 30/24* (2023.01)
(Continued)

(52) U.S. Cl.
CPC ............ *B64U 10/13* (2023.01); *B64U 30/24* (2023.01); *B64U 30/296* (2023.01); *B64U 40/10* (2023.01)

(58) Field of Classification Search
CPC ......... B64C 27/10; B64C 27/52; B64C 17/02; B64C 15/12; B64U 30/24; B64U 30/297
See application file for complete search history.

(56) References Cited

U.S. PATENT DOCUMENTS 4,163,535 A * 8/1979 Austin ................... B64U 30/24
                                                            244/17.11
5,071,383 A    12/1991 Kinoshita
(Continued)

FOREIGN PATENT DOCUMENTS

WO    WO-2020035715 A1 *    2/2020 ............. B64C 19/02

OTHER PUBLICATIONS

PCT International Search Report and Written Opinion mailed Feb. 16, 2023 in corresponding PCT Application No. PCT/US2022/049002, pp. 1-11.

(Continued)

*Primary Examiner* — Joshua J Michener
*Assistant Examiner* — Michael B. Kreiner
(74) *Attorney, Agent, or Firm* — McAfee & Taft

(57) ABSTRACT

A rotary wing vehicle has a vehicle body. A gimbal assembly mounted to or within the body. A propeller assembly is mounted to the gimbal. The propeller assembly has first and second fixed pitch propellers. The gimbal assembly has a first gimbal rotatable about a first axis and a second gimbal rotatable about a second axis.

20 Claims, 11 Drawing Sheets

(51) Int. Cl.
*B64U 30/296* (2023.01)
*B64U 40/10* (2023.01)

(56) References Cited

U.S. PATENT DOCUMENTS

| | | | |
|---|---|---|---|
| 6,719,244 B1* | 4/2004 | Gress | B64C 29/0033 |
| | | | 244/7 R |
| 6,783,096 B2 | 8/2004 | Baldwin | |
| 6,892,980 B2* | 5/2005 | Kawai | B64C 29/0033 |
| | | | 244/12.4 |
| 6,974,105 B2 | 12/2005 | Pham | |
| 7,510,142 B2 | 3/2009 | Johnson | |
| 9,272,779 B2* | 3/2016 | Groenewald | A63H 27/12 |
| 10,054,939 B1 | 8/2018 | Applewhite | |
| 10,222,795 B2 | 3/2019 | Margolin et al. | |
| 10,259,573 B2 | 4/2019 | GoerTek | |
| 10,322,796 B2* | 6/2019 | Lee | B64C 15/12 |
| 10,370,089 B2* | 8/2019 | Gamble | B64C 27/52 |
| 10,502,188 B2* | 12/2019 | Gamble | F03D 17/00 |
| 10,618,646 B2 | 4/2020 | McCullough et al. | |
| 10,703,472 B2 | 7/2020 | Scott | |
| 10,723,442 B2 | 7/2020 | Greiner et al. | |
| 10,737,765 B2* | 8/2020 | Oldroyd | B64C 11/32 |
| 10,814,968 B2* | 10/2020 | Gamble | B64C 27/39 |
| 10,850,836 B2 | 12/2020 | Jacob et al. | |
| 10,858,092 B2* | 12/2020 | Nam | B64D 27/16 |
| 11,027,840 B2* | 6/2021 | Zhang | B64C 17/02 |
| 11,174,848 B1* | 11/2021 | Rutland | B64C 25/20 |
| 11,194,358 B2 | 12/2021 | Parazynski et al. | |
| 11,932,428 B2* | 3/2024 | Benedict | B64C 27/59 |
| 2006/0102777 A1 | 5/2006 | Rock | |
| 2012/0018579 A1 | 1/2012 | Yan et al. | |
| 2014/0299708 A1 | 10/2014 | Green et al. | |
| 2016/0251077 A1* | 9/2016 | Amino | B64U 10/10 |
| | | | 244/17.23 |
| 2017/0283042 A1 | 10/2017 | Gamble | |
| 2018/0101169 A1 | 4/2018 | Applewhite | |
| 2018/0307225 A1 | 10/2018 | Line et al. | |
| 2019/0329882 A1 | 10/2019 | Baity et al. | |
| 2019/0337607 A1 | 11/2019 | Lee et al. | |
| 2020/0017207 A1 | 1/2020 | Alber | |
| 2020/0231275 A1 | 7/2020 | Groman | |
| 2021/0024209 A1 | 1/2021 | De Castro et al. | |
| 2021/0086894 A1 | 3/2021 | Jacob et al. | |
| 2021/0234418 A1* | 7/2021 | Mahajan | B64U 30/20 |
| 2021/0291971 A1 | 9/2021 | Bernard | |
| 2021/0371094 A1 | 12/2021 | Baldwin et al. | |
| 2021/0387739 A1* | 12/2021 | Neff | A63H 27/12 |
| 2023/0234728 A1* | 7/2023 | Lee | B64U 50/13 |
| | | | 244/62 |

OTHER PUBLICATIONS

NASA, Ingenuity Mars Helicopter, 2020, pp. 1-11, https://science.nasa.gov/mission/mars-2020-perseverance/ingenuity-mars-helicopter/.

Nasa, Mars Helicopter/Ingenuity Fact Sheet, 2020, pp. 1-2, https://mars.nasa.gov/files/mars2020/MarsHelicopterIngenuity_FactSheet.pdf.

Theworacle, Baldwin Technology Mono Tilt Rotor, Video on YouTube, 2006, https://www.youtube.com/watch?v=IFW7HEupkCM.

Baldwintechnology, Flight Test Video#1, Video on YouTube, 2010, https://www.youtube.com/watch?v=vBfW4mbrodAv.

Baldwin Technologies, Baldwin Mono Tiltrotor Unmanned Cargo Aircraft, Video on YouTube, 2009, https://www.youtube.com/watch?v=0qU19kmTVJM.

Leman, Jennifer, Meet the First Helo on Mars: A Deep Dive Into What Makes Ingenuity So . . . Ingenious, Feb. 20, 2021, pp. 1-13, Pop Mech Pro, https://www.popularmechanics.com/space/moon-mars/a35353442/ingenuity-mars-helicopter/.

Hackaday.IO, Photo Gallery of Dual Rotor with 2 Axis Gimbal, Oct. 2, 2021, https://hackaday.io/project/181977-omnirotor-an-agile-coaxial-all-terrain-vehicle.

* cited by examiner

ROTARY WING AIRCRAFT

CROSS-REFERENCE TO RELATED APPLICATIONS

This application claims the benefit of U.S. Provisional Application No. 63/276,165 filed Nov. 5, 2021, which is hereby incorporated by reference.

FIELD

This disclosure is related to unmanned rotary vehicles, referred to sometimes as drones, and the propulsion and flight control systems for such vehicles.

BACKGROUND

Unmanned rotary wing vehicles utilize different methods and mechanisms for propulsion and flight control. For example, cyclic control refers to the angling of individual blades in a propeller which affects/controls the roll of the vehicle. Collective pitch refers to changing the pitch of the rotor blades to control the lift of the vehicle. The pitch of the rotor blades of fixed pitch vehicles does not change, and the lift control is accomplished simply by varying the speed of the rotor.

DESCRIPTION OF A PREFERRED EMBODIMENT

Figure 1:
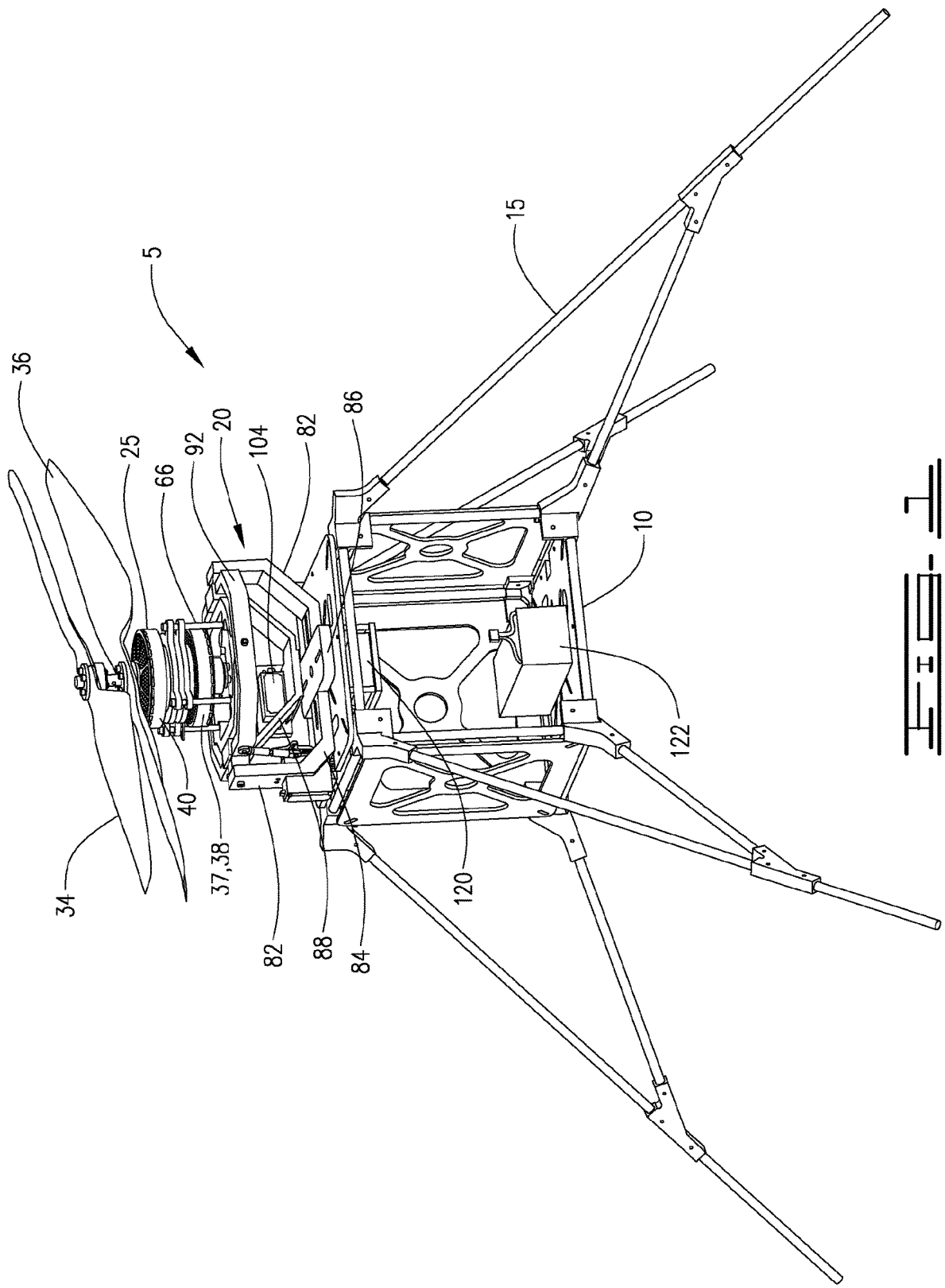
FIG. 1 is a perspective view of a rotary wing vehicle.

In the drawings and description that follow, like parts are typically marked throughout the specification and drawings with the same reference numerals, respectively. In addition, similar reference numerals may refer to similar components in different embodiments disclosed herein. The drawing figures are not necessarily to scale. Certain features of the invention may be shown exaggerated in scale or in somewhat schematic form and some details of conventional elements may not be shown in the interest of clarity and conciseness. The present invention is susceptible to embodiments of different forms. Specific embodiments are described in detail and are shown in the drawings, with the understanding that the present disclosure is not intended to limit the invention to the embodiments illustrated and described herein. It is to be fully recognized that the different teachings of the embodiments discussed herein may be employed separately or in any suitable combination to produce desired results.

Unless otherwise specified, use of the terms "connect," "engage," "couple," "attach," or any other like term describing an interaction between elements is not meant to limit the interaction to direct interaction between the elements and may also include indirect interaction between the elements described.

The current disclosure is directed to a rotary wing vehicle. The propulsion system for the drone comprises a coaxial motor assembly with differential thrust control and fixed pitch propellers. The coaxial motor assembly comprises a first propeller motor connected to a first, upper propeller and a second, lower propeller motor connected to a second propeller. The first motor rotates the first propeller in a first direction, and the second motor rotates the second propeller in a second direction opposite the first direction. The motors may be for example U8 Lite 190 KV motors. The first and second propellers in one embodiment may be fixed pitch carbon fiber propellers.

Flight control is accomplished using thrust vectoring with a two-axis gimbal controlled by servo motors. The servo motors may be for example Futaba® S3003 motors. The gimbal is a custom made gimbal and may be made, for example, using a 3D printer. The gimbal may comprise inner and outer gimbals rotatable about first and second perpendicular axes respectively. Adjustment of pitch and roll in flight is accomplished by adjusting the orientation of the inner and outer gimbals relative to the vehicle body. Thrust and yaw control is provided by using differential thrust, accomplished by adjusting the revolutions per minute (RPM) of one or both of the first and second propellers. The first and second propeller motors may comprise two U8 Lite 190 KV motors. The rotation and orientation of the inner and outer gimbals and the rotational speed of the upper and lower propellers may be controlled by a remote control unit that is in communication with an onboard flight controller. Such remote controls and controllers are well known.

Figure 2:
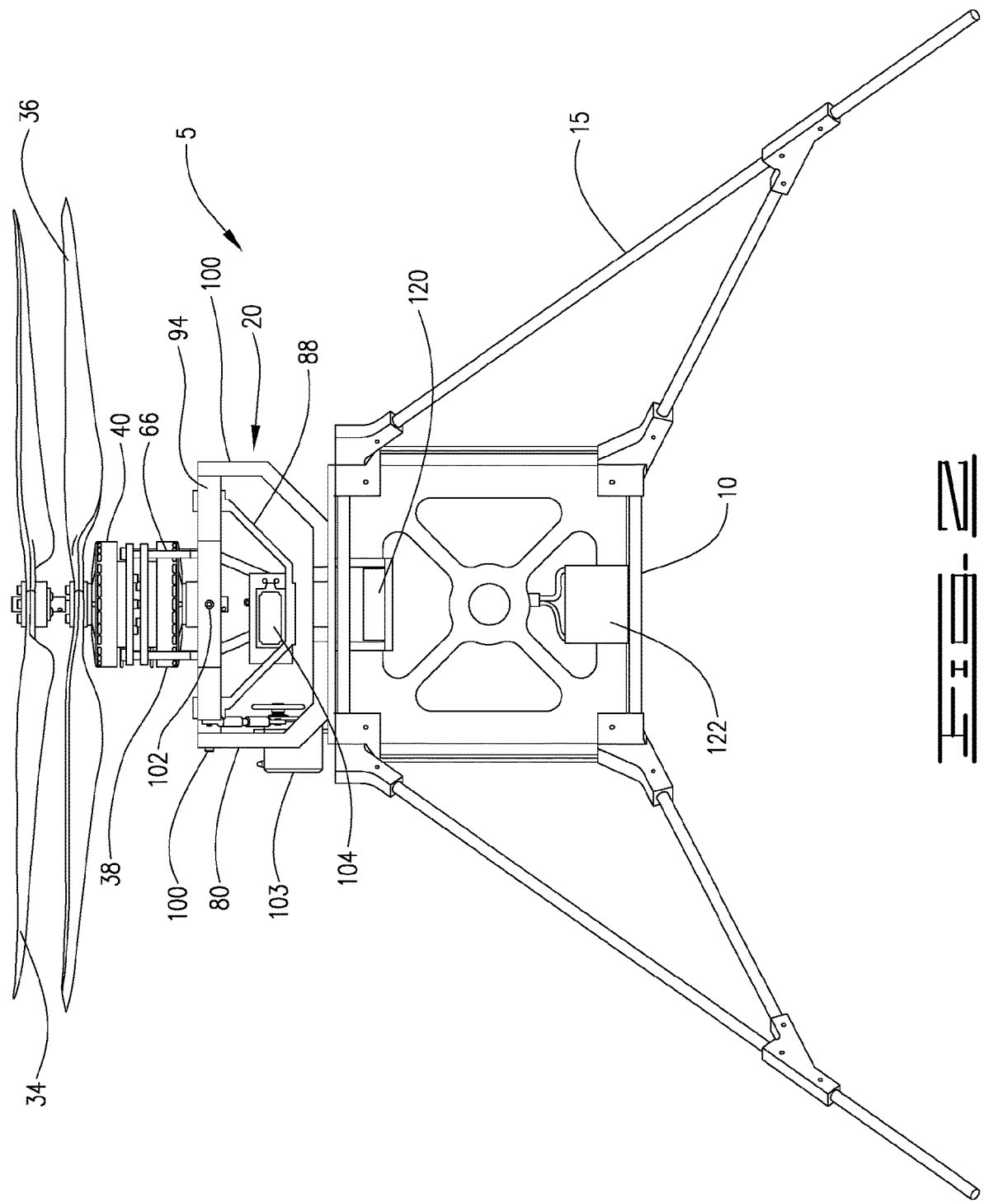
FIG. 2 is a side view of a rotary wing vehicle.
Figure 3:
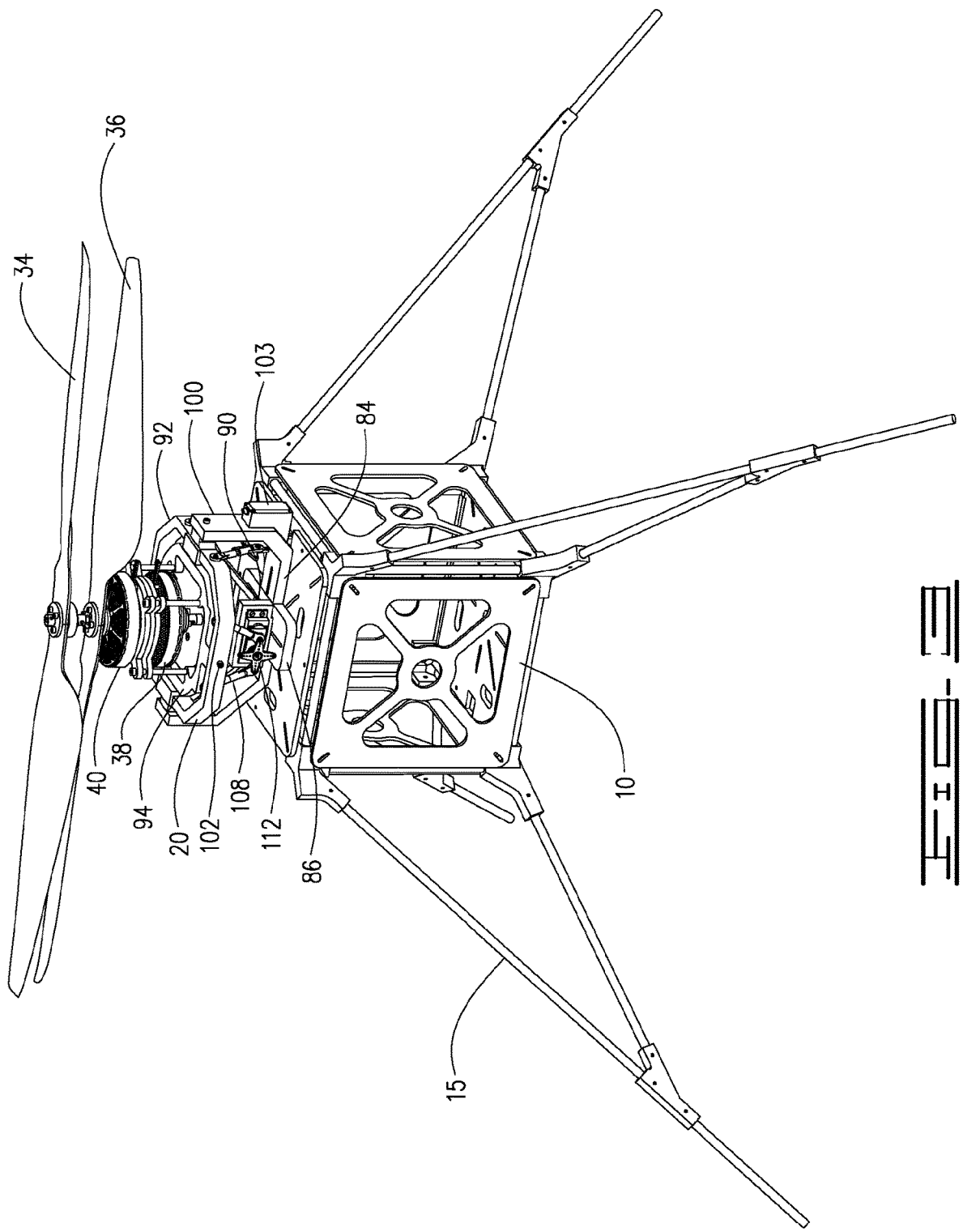
FIG. 3 is a perspective view of a rotary wing vehicle.

Referring now to the figures, and particularly to FIGS. 1-3, a drone vehicle 5, which may be referred to as an unmanned vehicle, comprises a vehicle body 10 with a landing gear 15 mounted thereto. A thrust vectoring mechanism 20 is mounted to, or within the vehicle body 10. In one embodiment, the thrust vectoring mechanism may be a two-axis gimbal assembly 20 mounted to vehicle body 10. A propulsion system 25 is mounted to gimbal 20. In one embodiment propulsion system 25 may comprise a pair of contra-rotating propellers. An onboard flight controller 120 and a battery 122 are likewise mounted to body 10 and provide power and control for the thrust vectoring mechanism 20 and propulsion system 25. Flight controller 120 is in communication with a remote control to be used by an operator as explained below.

Propulsion system 25 may comprise a first, upper propeller 34 and a second, lower propeller 36. First and second propellers 34 and 36 in the described embodiment are contra-rotating fixed pitch propellers. In the embodiment described first propeller 34 rotates clockwise and second propeller 36 rotates counterclockwise. In another embodiment the rotation of the propellers 34 and 36 may be switched, such that first propeller 34 rotates counterclockwise and second propeller 36 rotates clockwise. Propulsion system 25 further includes a coaxial motor assembly 37 connected to the first and second propellers. Coaxial motor assembly 37 comprises a first motor 38 which is connected to and which rotates first propeller 34 and a second motor 40 which is connected to and which rotates second propeller 36. First and second motors 38 and 40 are coaxial motors.

Figure 4:
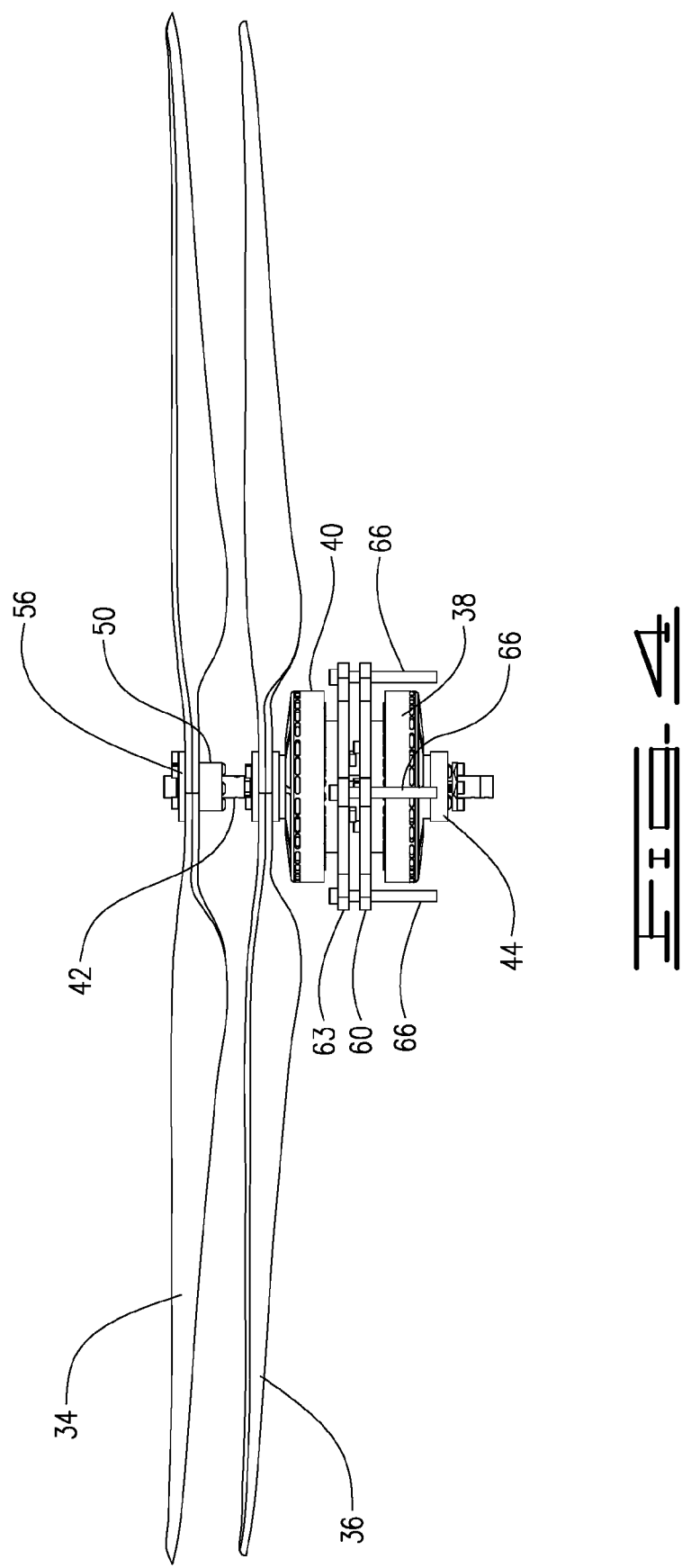
FIG. 4 is a view of the propulsion system of the vehicle.
Figure 5:
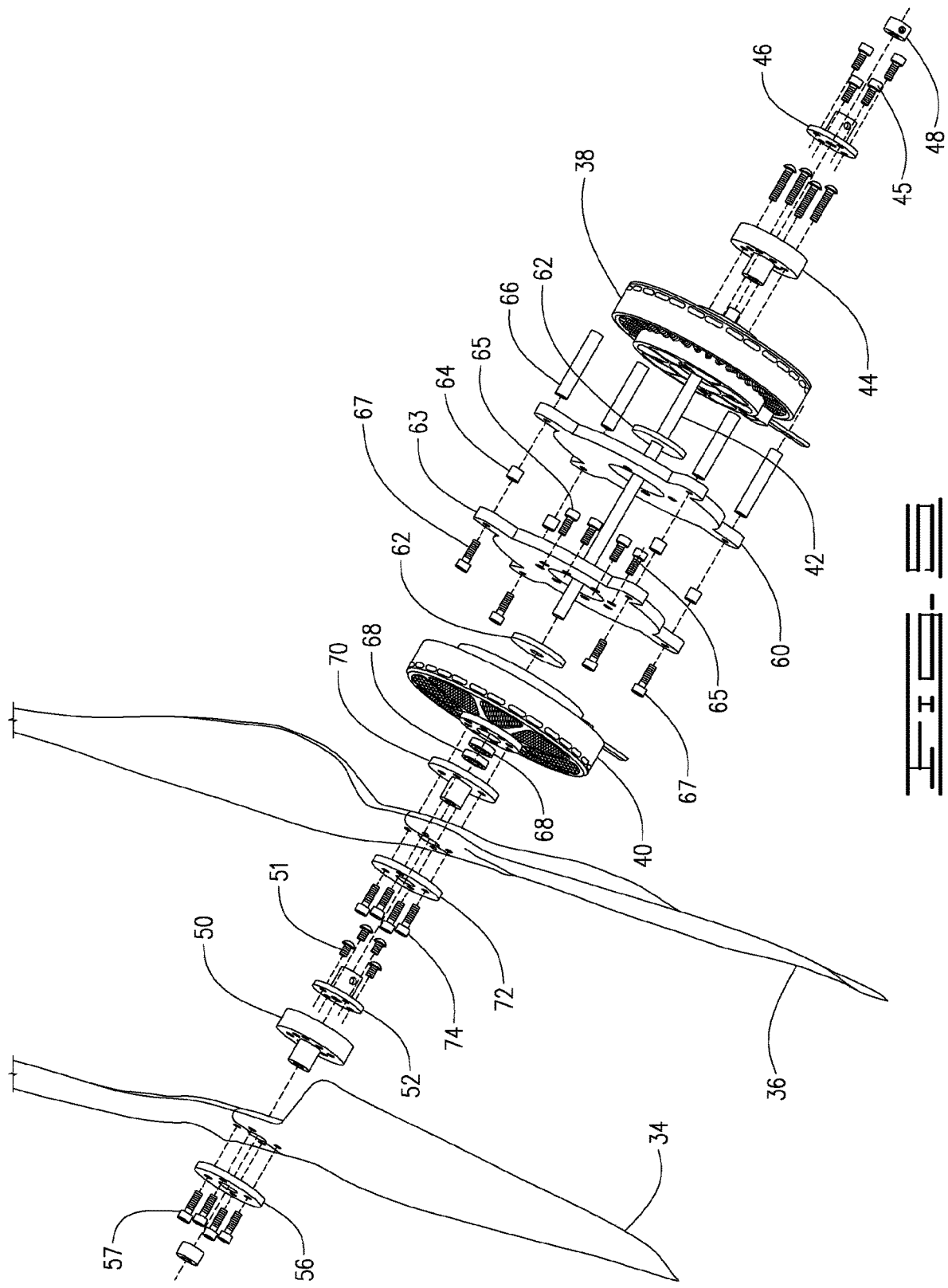
FIG. 5 is an exploded view of the propulsion system of the vehicle.
Figure 6:
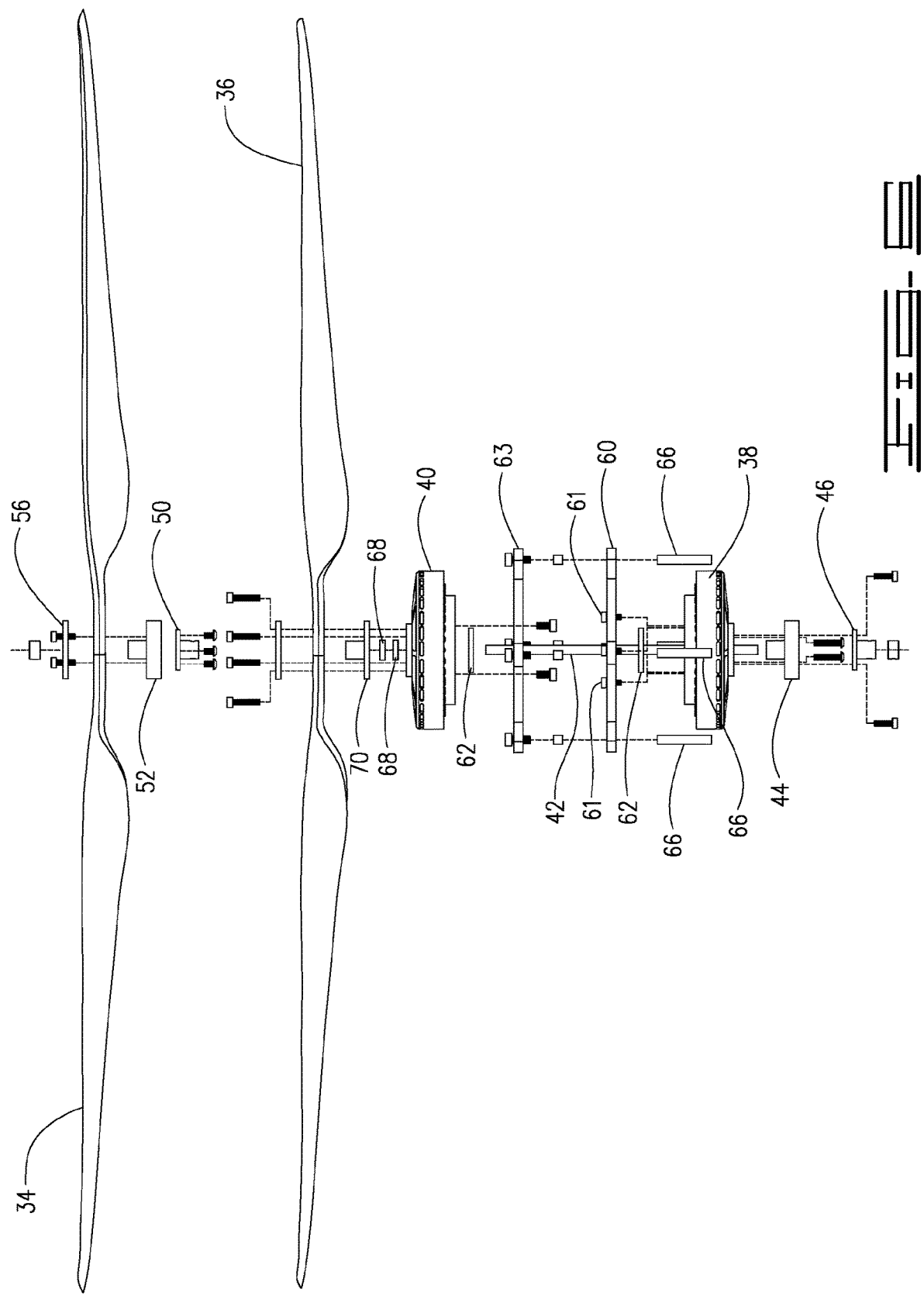
FIG. 6 is an additional exploded view of the propulsion system.
Figure 7:
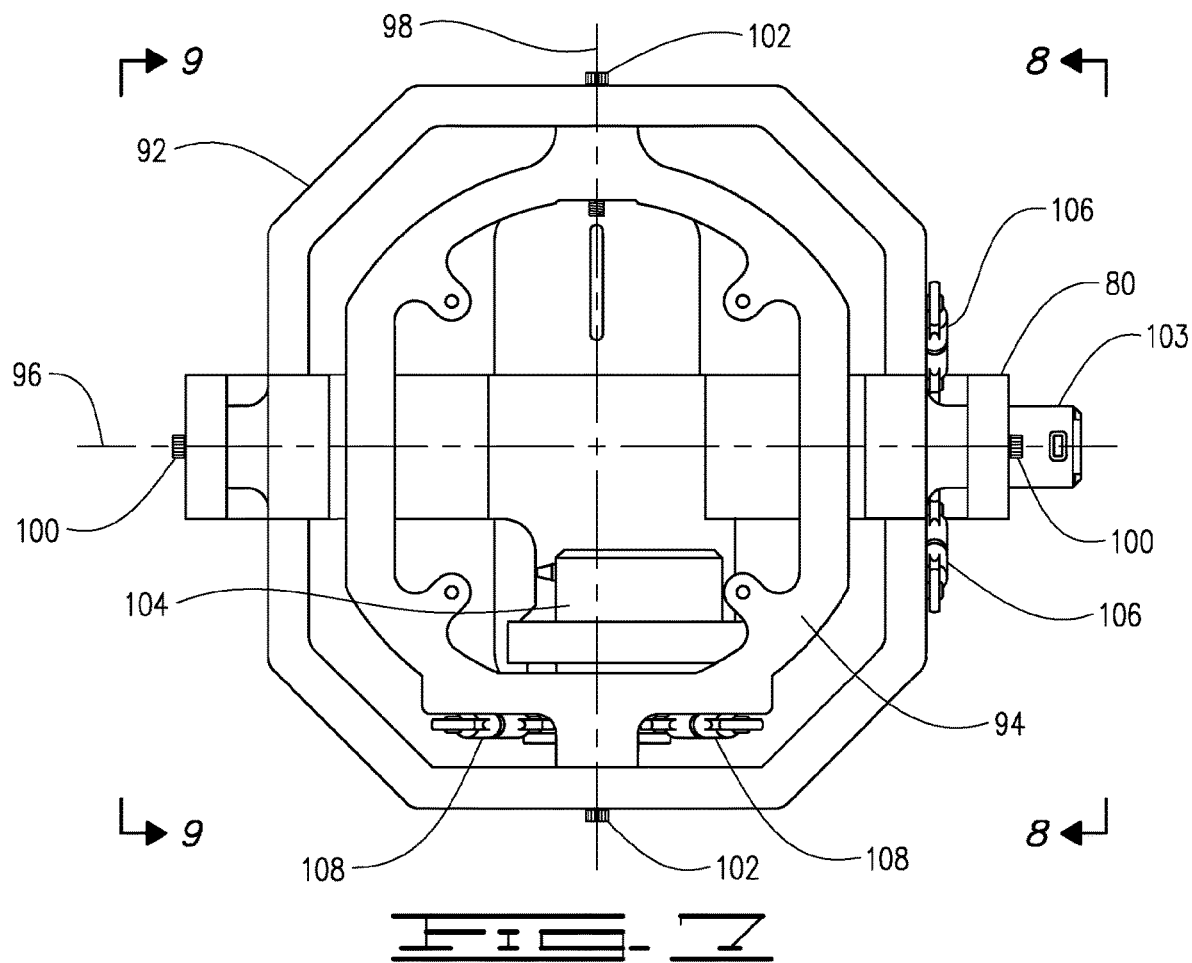
FIG. 7 is a top view of the thrust vectoring system.

As clearly seen in FIGS. 4 and 5, a shaft 42 is rotatably mounted in first motor 38 and is secured to first propeller 34. As a result, first motor 38 will rotate shaft 42 which will in turn rotate first propeller 34. Shaft 42 may be mounted in first motor 38 in a manner known in the art. In the embodiment described a first upper propeller collar 44 is mounted to first motor 38 with the plurality of fasteners 43. A flanged collar 46 is mounted to first upper propeller collar 44 with a plurality of fasteners 45 or other means known in the art. A set screw collar 48 is disposed about shaft 42 at a lower end thereof. A set screw is inserted through flanged collar 46 into shaft 42. An additional set screw is inserted through collar 48 into shaft 42. Motor 38 will rotate first upper propeller collar 44 and flanged collar 46 and as a result will rotate shaft 42.

Shaft 42 will extend upwardly through second motor 40 which as will be explained in more detail has bearings therein to allow rotation of shaft 42. A second upper propeller collar 50 is mounted to upper propeller 34. A top securing collar 56 may be disposed on the upper surface of upper propeller 34 with fasteners 57. Fasteners 57 may extend through upper propeller 34 to connect to second upper propeller collar 50. A flanged connecting collar 52 may likewise be connected to second upper propeller collar 50 with fasteners 51. Set screws may extend through flanged connecting collar 52 to engage shaft 42. First and second upper propeller collars 44 and 50 may be identical. Propeller collar 50 is rotated by shaft 42.

A first motor mount plate 60 is attached to first motor 38 with a plurality of fasteners 61 or other means known in the art. A spacer 62 may be positioned between first motor mount plate 60 and first motor 38. A second motor mount plate 63 is attached to second motor 40 with a plurality of fasteners 65 or other means known in the art. A second spacer 62 may be disposed between second motor mount plate 63 and second motor 40. Separators 64 may be positioned between first and second motor mount plates 60 and 63 respectively. A plurality of standoffs 66 may be connected with fasteners 67 that extend through the first and second motor mount plates 60 and 63 and through separators 64. Standoffs 66 will then be mounted to gimbal 20 so that propulsion system 25 is movable with gimbal 20.

Bearings 68 may be disposed in second motor 40 so that shaft 42 may freely rotate therein. Although described as being disposed in motor 40, bearings 68 may be positioned external to motor 40 in other embodiments. A second prop alignment collar 70 may extend through an opening in second propeller 36. A second securing collar 72 is connected to second prop alignment collar 70 with fasteners 74 that extend therethrough. Fasteners 74 likewise extend through second prop alignment collar 70 into motor 40 such that propeller alignment collar 70 is rotated thereby and as a result rotates second propeller 36. It will be understood by those in the art the position of the first and second motors 38 and 40 may be swapped, such that first motor 38 is positioned directly beneath second propeller 36, between second motor 40 and second propeller 36.

As shown for example in FIGS. 1, 2 and 7-10, gimbal assembly 20 is a two-axis gimbal that may comprise a gimbal bracket 80 fixed to, or within to vehicle body 10. Gimbal bracket 80 may comprise outer gimbal mounting legs 82 extending upwardly from a first mounting plate 84 that is mounted to body 10. Legs 82 may be integral with body 10 and extend upwardly therefrom in an alternative embodiment. Gimbal bracket 80 may further comprise a second mounting plate 86 fixed to body 10. Mounting plates 84 and 86 are connected to body 10 with fasteners or other known means. An inner gimbal mounting bracket 88 is connected to a first, or outer gimbal 92 and is rotatable therewith. A servo motor mounting panel 90 is connected to inner gimbal mounting bracket 88. Outer gimbal 92 is pivotally connected to gimbal mounting bracket 80 with pivot pins 100. A second, or inner gimbal 94 is pivotably connected to outer gimbal 92 with pivot pins 102. Outer gimbal 92 will rotate about an axis 96 and inner gimbal 94 will rotate about an axis 98 that is perpendicular to axis 96. As noted above inner gimbal 94 rotates with outer gimbal 92.

A first, or outer gimbal servo motor 103 is mounted to one of mounting legs 82. Servo motor 103 may be of a type known in the art and may be for example a Futaba® S3003. A second, or inner gimbal servo motor 104 may be connected to mounting panel 90 and may likewise be a Futaba® S3003.

Figure 8:
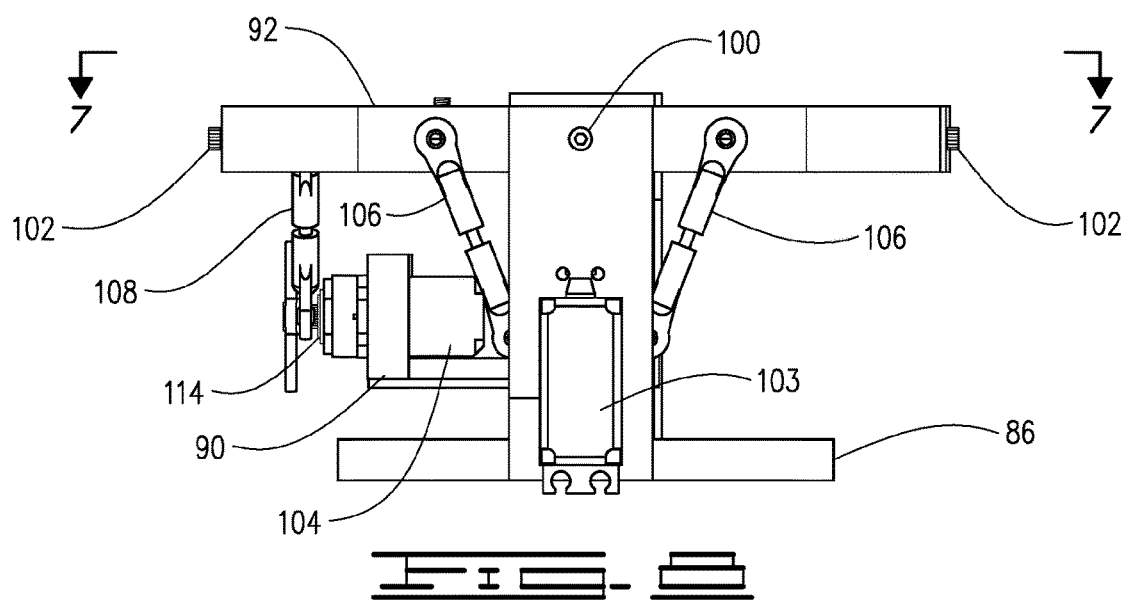
FIG. 8 is a side view of the thrust vectoring system.
Figure 9:
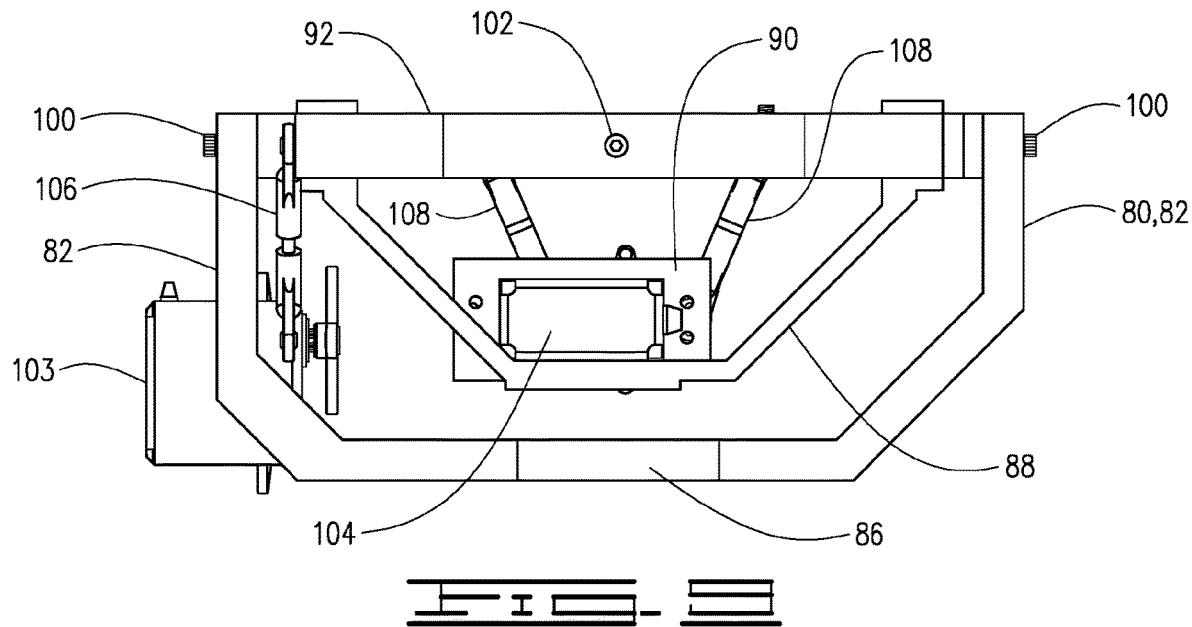
FIG. 9 is a front view of the thrust vectoring system.
Figure 10:
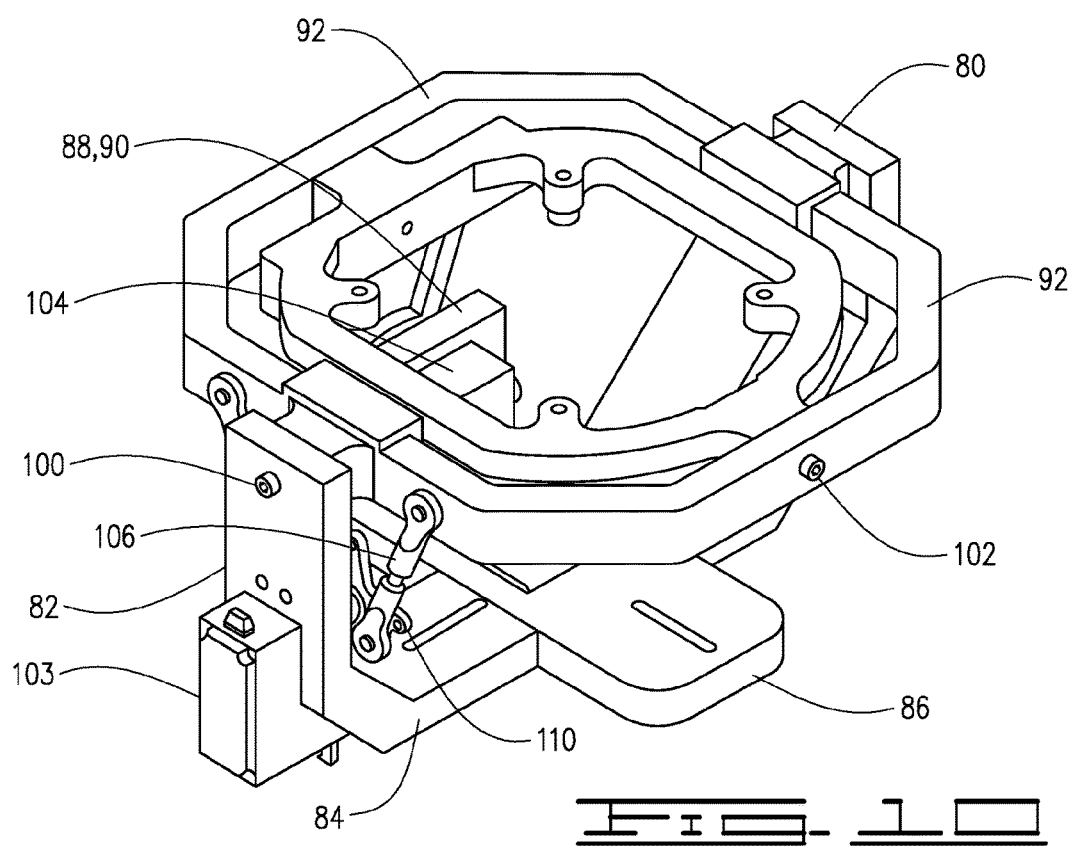
FIG. 10 is an additional perspective view of the thrust vectoring system.
Figure 11:
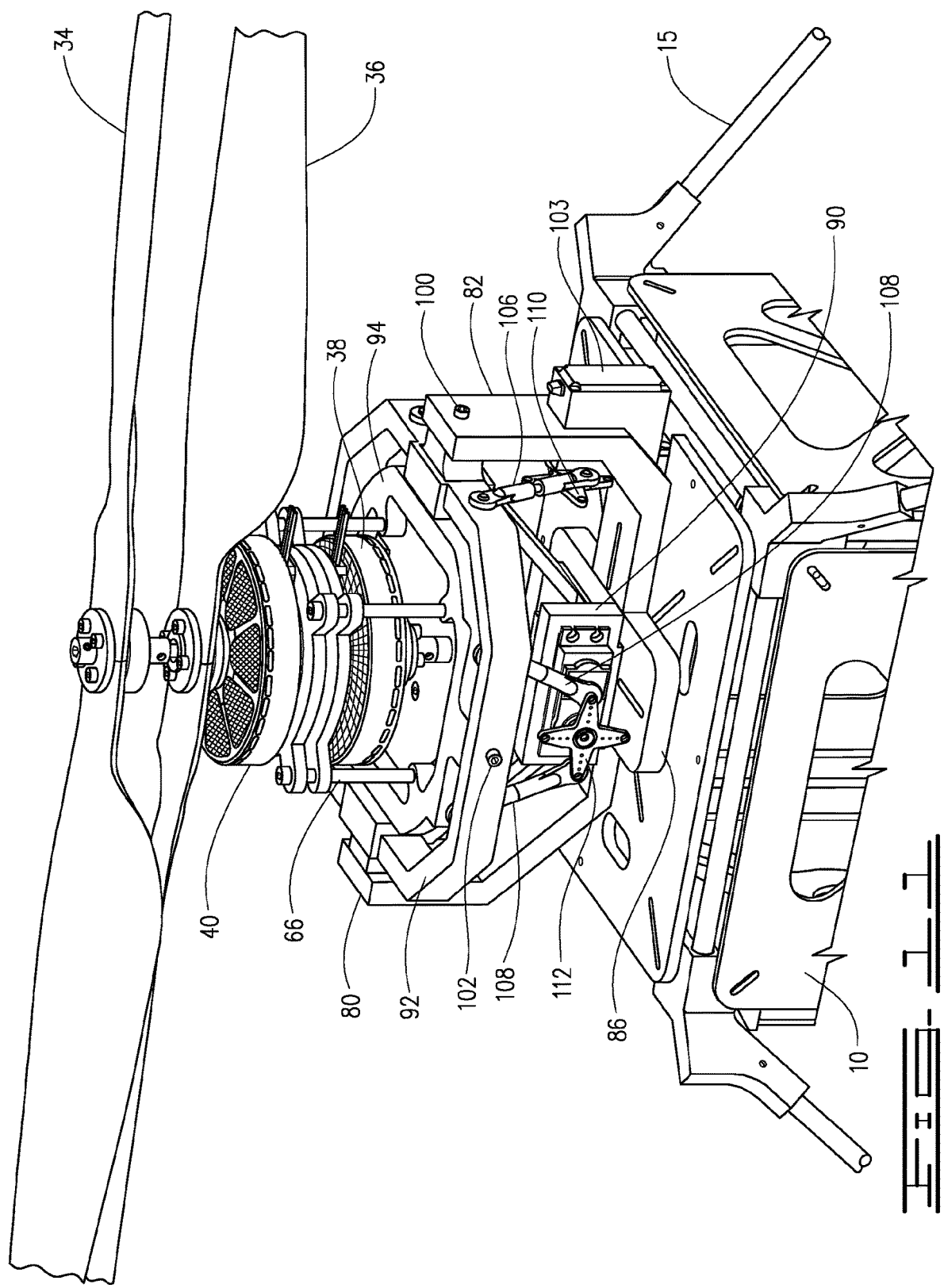
FIG. 11 is an expanded view of the thrust vectoring system.

As shown in FIGS. 8 and 11, a pair of control arms 106 are pivotally connected to outer gimbal 92 and also connected to a servo horn 110 at lower ends thereof. A pair of control arms 108 are connected to inner gimbal 94 and are connected to each other by a servo horn 112 at the lower ends thereof. Servo horn 110 although not shown as clearly is like servo horn 112. A drive shaft 114 extends from servo motor 104 and is connected to servo horn 112. Rotation of shaft 114 will rotate servo horn 112 which will cause movement of control arms 108 to move in an up and down motion, which in turn rotates inner gimbal 94 about pivot pins 102. A drive shaft extending from servo motor 103 will likewise be connected to servo horn 110. The drive shaft extending from servo motor 103 will rotate servo horn 110 to move control arms 106 up and down, which causes outer gimbal 92 to rotate about pivot pins 100.

Vehicle 5 may include an on board flight controller 120 with a built in receiver and a battery 122 to provide power to both of servos 103 and 104 and propeller motors 38 and 40. A remote control 124 may be utilized to control the operation of vehicle 5.

Figure 12:
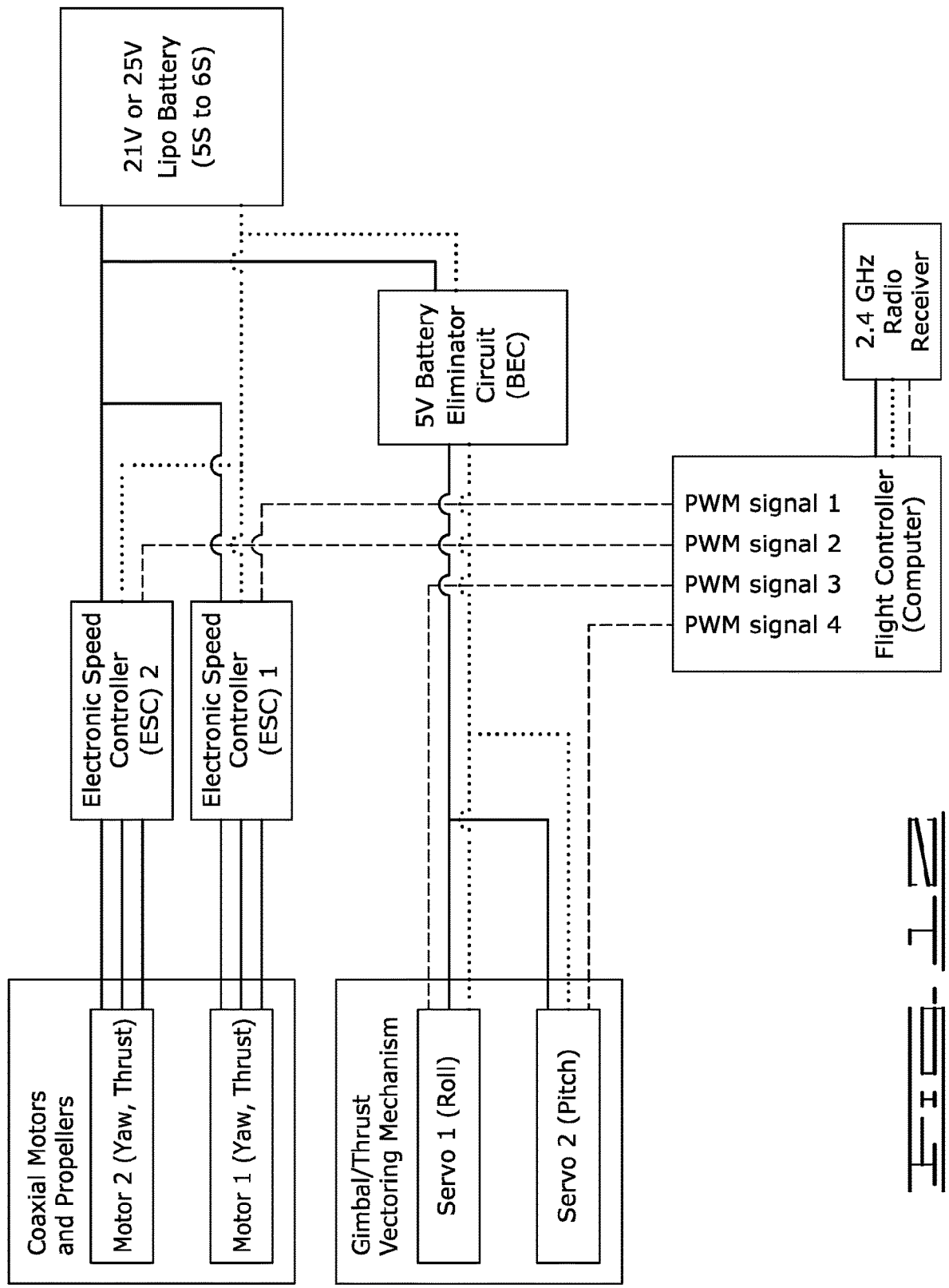
FIG. 12 is an exemplary wiring diagram.

An exemplary wiring diagram is shown in FIG. 12. The battery, which may be for example a 21 or 25 Volt lipo battery, provides power to both of motors 38 and 40 with speed controllers. Likewise, the battery provides power to the two servo motors 103 and 104. A pulse width modulator may be included.

Figure 13:
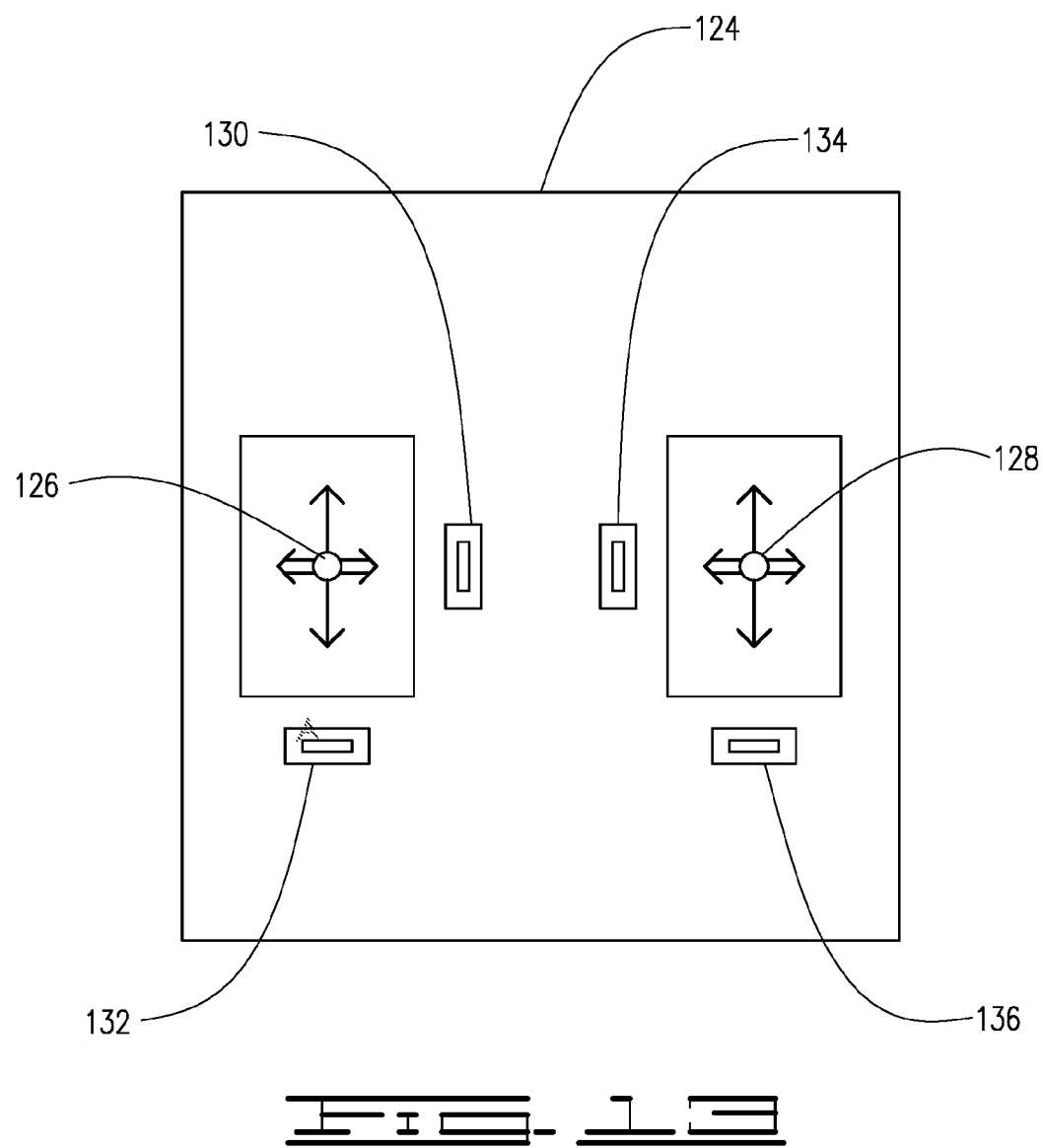
FIG. 13 is a schematic of a remote control.

In operation vehicle 5 is controlled with a remote control 124 that communicates with on board flight controller 120. The yaw and thrust of the vehicle are controlled by varying the rotational speed of motors 38 and 40 respectively, which varies the rotational speed of propellers 34 and 36. The speed of each motor 38 and 40 is independently controlled so that yaw is created by rotating the propellers 34 and 36 at different speeds. Yaw to the left is generated by rotating the lower propeller 36 at a slower speed than upper propeller 34, and yaw to the right is created by rotating upper propeller 34 slower than lower propeller 36. The roll and pitch of vehicle 5 is controlled by gimbal 20. Rotation of inner gimbal 94 will adjust the roll of vehicle 5 and rotation of outer gimbal 92 will adjust the pitch of the vehicle. The rotation of each can be manipulated with remote control 124 schematically depicted in FIG. 13 which in the embodiment described communicates wirelessly in a manner known in the art with controller 120. Alternatively, the vehicle 5 may be tethered to a base station, and be controlled through wired communication through the tether. Remote control 124 may have control knobs 126 and 128 and trim wheels 130, 132, 134 and 136. Control knob 126 moves in all directions (up and down and side to side). Up and down movement is the throttle control, and controls the speed of both of motors 38 and 40. Side to side movement of control knob 126 controls yaw by slowing and/or speeding up of one, or both of motors 38 and 40 so that the rotational speed of the propellers 34 and 36 is different, thereby creating the desired yaw. Control wheel 132 is used to trim yaw, and control wheel 130 is used to trim throttle. Control knob 128 controls the pitch and roll by controlling servo motors 103 and 104. Up and down movement causes rotation of the shaft of motor 103 which moves outer gimbal 92 to change/control pitch. Side to side movement causes rotation of the shaft of motor 104 which moves inner gimbal 94 to change/control roll.

An exemplary wiring diagram is shown in FIG. 12. In the described embodiment, onboard controller 120 has a built in pulse width modulator and a radio receiver for receiving commands from a remote control unit. As noted above, control of the vehicle may be through a tether to the vehicle 5, establishing a wired connection to vehicle 5 through which commands may be sent. In addition, the vehicle 5 may be preprogrammed. For example, flight controller 120 may be preprogrammed to follow a specific flight path and pattern. In such a case, the remote control 124 may provide a command that allows the activation of an autopilot and one or more preprogrammed flight instructions that are included in the onboard controller. Both of servo motors 103 and 104 include electronic speed controllers as are known in the art.

Embodiments include but are not limited to:

Embodiment 1. A rotary wing vehicle comprising: a vehicle body; a gimbal mounted to the body; a propeller assembly mounted to the gimbal, the propeller assembly comprising first and second fixed pitch propellers, the gimbal comprising a first gimbal rotatable about a first axis; and a second gimbal rotatable about a second axis, the first and second propellers movable with the first and second gimbals.

Embodiment 2. The rotary wing vehicle of embodiment 1, further comprising a propeller motor assembly mounted to the body and operable to rotate the first and second fixed pitch propellers in opposite directions.

Embodiment 3. The rotary wing vehicle of any of embodiments 1-2, the propeller motor assembly comprising a coaxial motor assembly with a first propeller motor connected to the first propeller and a second propeller motor connected to the second motor.

Embodiment 4. The rotary wing vehicle of any of embodiments 1-3 further comprising: a first gimbal motor operable to rotate the first gimbal about the first axis; and a second gimbal operable to rotate the second gimbal about the second axis.

Embodiment 5. The rotary wing vehicle of embodiment 4, wherein the first gimbal rotates about the first axis relative to the second gimbal, and wherein when the second gimbal rotates about the second axis and the first gimbal rotates therewith.

Embodiment 6. The rotary wing vehicle of embodiment 2, further comprising an on-board controller in communication with the propeller motor assembly for controlling the speed of the first and second propellers.

Embodiment 7. The rotary wing vehicle of embodiment 6, further comprising: first and second gimbal motors connected to the first and second gimbals, the on-board controller being in communication with the first and second gimbal motors, the first and second gimbal motors begin rotatable in response to a signal from the on-board controller.

Embodiment 8. A rotary wing vehicle comprising: a vehicle body; a rotatable thrust vectoring mechanism fixed to the vehicle body; a first fixed pitch propeller mounted to the thrust vectoring mechanism and rotatable therewith; and a second fixed pitch propeller spaced from the first fixed pitch propeller and mounted to the thrust vectoring mechanism, the second fixed pitch propeller rotatable with the thrust vectoring mechanism; a propeller motor assembly connected to the first and second fixed pitch propellers; and a power source mounted to the vehicle body and connected to the propeller motor assembly.

Embodiment 9. The rotary wing vehicle of embodiment 8 the propeller motor assembly comprising: a first propeller motor connected to the first fixed pitch propeller and operable to rotate the first fixed pitch propeller in a first direction; and a second propeller motor connected to the second fixed pitch propeller and operable to rotate the second fixed pitch propeller in a second direction opposite the first direction.

Embodiment 10. The rotary wing vehicle of embodiment 9, the thrust vectoring mechanism comprising: an outer gimbal rotatably mounted to the vehicle body; and rotatable about a first axis; and an inner gimbal mounted to the outer gimbal, the inner gimbal rotatable relative to the outer gimbal about a first axis and the outer gimbal rotatable about a second axis perpendicular to the first axis, the inner gimbal rotatable with the outer gimbal about the second axis.

Embodiment 11. The rotary wing vehicle of embodiment 10, the first and second fixed pitch propellers mounted to the inner gimbal.

Embodiment 12. The rotary wing vehicle of either of embodiments 10 or 11 further comprising first and second gimbal motors connected to the inner and outer gimbals, respectively, and operable to rotate the first and second gimbals about the first and second axis, respectively.

Embodiment 13. The rotary wing vehicle of embodiment 12 further comprising an on-board controller mounted to the vehicle body and communicated with the first and second propeller motors and the first and second gimbal motors, the on-board controller configured to vary the speeds of the first and second fixed pitch propellers and to rotate the first and second gimbals upon receiving signals from a remote control communicated with the on-board controller.

Embodiment 14. A rotary wing vehicle comprising: a vehicle body; a thrust vectoring mechanism rotatably mounted to the vehicle body; first and second contra-rotating fixed pitch propellers mounted to the thrust vectoring mechanism: a coaxial propeller motor assembly connected to the first and second contra rotating fixed pitch propellers; and an on-board controller communicated with the coaxial propeller motor assembly operable to control the speed of the first and second contra-rotating fixed pitch propellers upon receiving a signal from a remote control in communication with the on board controller.

Embodiment 15. The rotary wing vehicle of embodiment 14, wherein pitch and roll of the vehicle are controlled by rotating the thrust vectoring mechanism.

Embodiment 16, The rotary wing vehicle of either of embodiments 14 or 15, wherein the yaw of the vehicle is controlled by varying the speed of rotation of the upper and lower fixed pitch propellers.

Embodiment 17. The rotary wing vehicle of any of embodiments 14-16, the thrust vectoring mechanism comprising: a gimbal bracket fixed to the vehicle body; an outer gimbal rotatably mounted to the gimbal bracket; and an inner gimbal rotatably mounted to the outer gimbal.

Embodiment 18. The rotary wing vehicle of embodiment 17 wherein the first and second fixed pitch propellers move with the rotation of either or both of the inner and outer gimbals.

Embodiment 19. The rotary wing vehicle of embodiment 18, the spatial relationship between the first and second propellers being fixed.

Embodiment 20. The rotary wing vehicle of any of embodiments 17-19 further comprising first and second gimbal motors connected to the first and second gimbals, the on-board controller being in communication with the first and second gimbal motors and operable to rotate the first and second gimbals upon receiving a signal from the remote control.

Embodiment 21. The rotary wing vehicle of any of embodiments 17-20, wherein the rotary wing vehicle is tethered to a base station and the remote control communicates with the onboard controller through a wired connection.

Embodiment 22. The rotary wing vehicle of any of embodiments 17-20, wherein the remote control communicates wirelessly with a base station that communicates via a tether to the vehicle.

Embodiment 23. The rotary wing vehicle of either of embodiments 6 or 7, wherein the onboard controller includes at least one preprogrammed set of flight instructions and an autopilot function.

Thus, it is seen that the apparatus and methods of the present invention readily achieve the ends and advantages mentioned as well as those inherent therein. While certain preferred embodiments of the invention have been illustrated and described for purposes of the present disclosure, numerous changes in the arrangement and construction of parts and steps may be made by those skilled in the art, which changes are encompassed within the scope and spirit of the present invention.

Furthermore, no limitations are intended to the details of construction or design herein shown, other than as described in the claims below. It is, therefore, evident that the particular illustrative embodiments disclosed above may be altered or modified and all such variations are considered within the scope and spirit of the present disclosure.

As used herein, the words "comprise," "have," "include," and all grammatical variations thereof are each intended to have an open, non-limiting meaning that does not exclude additional elements or steps. It should also be understood that, as used herein, "first," "second," and "third," are assigned arbitrarily and are merely intended to differentiate between two or more elements as the case may be, and does not indicate any sequence. Furthermore, it is to be understood that the mere use of the word "first" does not require that there be any "second," and the mere use of the word "second" does not require that there be any "third," etc. Throughout this disclosure, the terms "about," "approximate," and variations thereof, are used to indicate that a value includes the inherent variation or error for the device, system, or measuring method being employed as recognized by those skilled in the art.

What is claimed is:

1. A rotary wing vehicle comprising:
a vehicle body;
a gimbal assembly mounted to or within the body;
a propeller assembly mounted to the gimbal assembly, the propeller assembly comprising first and second fixed pitch propellers, the gimbal assembly comprising:
a first gimbal member rotatable about a first axis; and
a second gimbal member rotatable about a second axis perpendicular to the first axis, wherein the second gimbal member encircles the first gimbal member, and wherein the first gimbal member is rotatable about the first axis relative to the second gimbal member and is pinned to and rotatable with the second gimbal member about the second axis, and wherein the first and second propellers move with the first and second gimbals members.

2. The rotary wing vehicle of claim 1, further comprising a propeller motor assembly mounted to or within the body and operable to rotate the first and second fixed pitch propellers in opposite directions.

3. The rotary wing vehicle of claim 2, the propeller motor assembly comprising a coaxial motor assembly with a first propeller motor connected to the first propeller and a second propeller motor connected to the second motor.

4. The rotary wing vehicle of claim 2, further comprising an on-board controller in communication with the propeller motor assembly for controlling the speed of the first and second propellers.

5. The rotary wing vehicle of claim 4, further comprising:
first and second gimbal motors connected to the first and second gimbals members, the on-board controller being in communication with the first and second gimbal motors, the first and second gimbal motors being rotatable in response to a signal from the on-board controller.

6. The rotary wing vehicle of claim 1 further comprising:
a first gimbal motor operable to rotate the first gimbal member about the first axis; and
a second gimbal motor operable to rotate the second gimbal member about the second axis.

7. The rotary wing vehicle of claim 1, wherein the propeller assembly is mounted to the inner gimbal member.

8. A rotary wing vehicle comprising:
a vehicle body;
a rotatable thrust vectoring mechanism fixed to the vehicle body, the thrust vectoring mechanism comprising;
an outer gimbal member rotatably mounted to the vehicle body; and
an inner gimbal member encircled by the outer gimbal member and mounted to the outer gimbal member, the inner gimbal member rotatable relative to the outer gimbal member about a first axis and the outer gimbal member rotatable about a second axis perpendicular to the first axis, the inner gimbal member rotatable with the outer gimbal member about the second axis;
a first fixed pitch propeller mounted to the inner gimbal member of the thrust vectoring mechanism and rotatable therewith;
a second fixed pitch propeller spaced from the first fixed pitch propeller and rotatable with the thrust vectoring mechanism;
a propeller motor assembly connected to the first and second fixed pitch propellers; and
a power source mounted to the vehicle body and connected to the propeller motor assembly.

9. The rotary wing vehicle of claim 8 the propeller motor assembly comprising:
a first propeller motor connected to the first fixed pitch propeller and operable to rotate the first fixed pitch propeller in a first direction; and a second propeller motor connected to the second fixed pitch propeller and operable to rotate the second fixed pitch propeller in a second direction opposite the first direction.

10. The rotary wing vehicle of claim 8 further comprising first and second gimbal motors connected to the inner and outer gimbals members, respectively, and operable to rotate the inner and outer gimbals members about the first and second axis, respectively.

11. The rotary wing vehicle of claim 10 further comprising an on-board controller mounted to the vehicle body and communicated with the first and second propeller motors and the first and second gimbal motors, the on-board controller configured to vary the speeds of the first and second fixed pitch propellers and to rotate the first and second gimbals members upon receiving signals from a remote control communicated with the on-board controller.

12. The rotary wing vehicle of claim 8, further comprising a pivot pin extending through the outer gimbal member into the inner gimbal member.

13. A rotary wing vehicle comprising:
a vehicle body;
a rotatable thrust vectoring mechanism mounted to the vehicle body, the thrust vectoring mechanism comprising;
a gimbal bracket fixed to the vehicle body:
an outer gimbal member rotatably mounted to the gimbal bracket; and
an inner gimbal member encircled by the outer gimbal member and mounted thereto;
first and second contra-rotating fixed pitch propellers mounted to the thrust vectoring mechanism and rotatable therewith:
a propeller motor assembly connected to the first and second contra rotating fixed pitch propellers; and
an on-board controller communicated with the coaxial propeller motor assembly operable to control the speed of the first and second contra-rotating fixed pitch propellers upon receiving a signal from a remote control in communication with the on-board controller.

14. The rotary wing vehicle of claim 13, wherein pitch and roll of the vehicle are controlled by rotating the thrust vectoring mechanism.

15. The rotary wing vehicle of claim 13, wherein the yaw of the vehicle is controlled by varying the speed of rotation of the upper and lower fixed pitch propellers.

16. The rotary wing vehicle of claim 13 wherein the first and second fixed pitch propellers move with the rotation of either or both of the inner and outer gimbals members.

17. The rotary wing vehicle of claim 16, the spatial relationship between the first and second propellers being fixed.

18. The rotary wing vehicle of claim 13 further comprising first and second gimbal motors connected to the inner and outer gimbals members, the on-board controller being in communication with the first and second gimbal motors and operable to rotate the first and second gimbals members upon receiving a signal from the remote control.

19. The rotary wing vehicle of claim 13,
wherein the inner gimbal member is rotatable relative to the outer gimbal member about a first axis and the outer gimbal member is rotatable about a second axis perpendicular to the first axis, the inner gimbal member rotatable with the outer gimbal about the second axis.

20. The rotary wing vehicle of claim 13, further comprising a pivot pin extending through the outer gimbal member into the inner gimbal member.

\* \* \* \* \*